(12) United States Patent
Murphy et al.

(10) Patent No.: US 9,098,674 B2
(45) Date of Patent: Aug. 4, 2015

(54) DATA PROCESSING APPARATUS FOR SEGMENTAL PROCESSING OF INPUT DATA, SYSTEMS USING THE APPARATUS AND METHODS FOR DATA TRANSMITTAL

(75) Inventors: Nick Murphy, The Sands (GB); Philip Laws, Ashford (GB); Teck Chee Lee, Singapore (SG); Yew Teng Too, Singapore (SG); Paul Pontin, Esher (GB)

(73) Assignee: Creative Technology Ltd, Singapore (SG)

( * ) Notice: Subject to any disclaimer, the term of this patent is extended or adjusted under 35 U.S.C. 154(b) by 193 days.

(21) Appl. No.: 13/143,623

(22) PCT Filed: Sep. 11, 2009

(86) PCT No.: PCT/SG2009/000327
§ 371 (c)(1),
(2), (4) Date: Oct. 4, 2011

(87) PCT Pub. No.: WO2010/080070
PCT Pub. Date: Jul. 15, 2010

(65) Prior Publication Data
US 2012/0026281 A1 Feb. 2, 2012

Related U.S. Application Data

(60) Provisional application No. 61/143,074, filed on Jan. 7, 2009.

(51) Int. Cl.
*H04N 7/15* (2006.01)
*G06F 15/80* (2006.01)
*G06T 1/20* (2006.01)

(52) U.S. Cl.
CPC .............. *G06F 15/8053* (2013.01); *G06T 1/20* (2013.01)

(58) Field of Classification Search
None
See application file for complete search history.

(56) References Cited

U.S. PATENT DOCUMENTS 5,587,743 A * 12/1996 Montgomery et al. ....... 348/473
5,860,019 A * 1/1999 Yumoto ........................ 712/26
(Continued)

FOREIGN PATENT DOCUMENTS

EP 0495575 B1 7/1992

OTHER PUBLICATIONS

Singh, Hartej, et al. "MorphoSys: an integrated reconfigurable system for data-parallel and computation-intensive applications." Computers, IEEE Transactions on 49.5 (2000): 465-481.*

(Continued)

*Primary Examiner* — Tize Ma
*Assistant Examiner* — Yu Chen
(74) *Attorney, Agent, or Firm* — Russell Swerdon; Desmund Gean

(57) ABSTRACT

There is provided a data processing apparatus for segmental processing of input data. The apparatus includes a plurality of data processors connected in a series configuration, the plurality of data processors being able to transmit discrete data packets over a video bus to one another, with the plurality of data processors being divided into a plurality of data processing sets; and a central controller coupled to the plurality of data processors for controlling allocation of the input data to the plurality of data processing sets, the central controller being also for controlling transmission of output data from the apparatus. The apparatus incorporates several varying methods for data transmittal amongst data processors and has several applications which will be described.

11 Claims, 11 Drawing Sheets

(56) References Cited

U.S. PATENT DOCUMENTS

| | | | |
|---|---|---|---|
| 6,473,087 B1* | 10/2002 | Tsang | 345/505 |
| 6,584,077 B1* | 6/2003 | Polomski | 370/263 |
| 6,763,390 B1* | 7/2004 | Kovacevic et al. | 709/231 |
| 7,912,302 B2* | 3/2011 | Stein et al. | 382/234 |
| 2006/0271717 A1* | 11/2006 | Koduri et al. | 710/241 |
| 2008/0068446 A1* | 3/2008 | Barkley et al. | 348/14.07 |
| 2008/0240254 A1* | 10/2008 | Au et al. | 375/240.24 |
| 2009/0106530 A1* | 4/2009 | Lauterbach et al. | 712/30 |
| 2009/0213126 A1 | 8/2009 | Evans | |

OTHER PUBLICATIONS

Ganesan, Mahendra Kumar Angamuthu, et al. "H. 264 decoder at HD resolution on a coarse grain dynamically reconfigurable architecture." Field Programmable Logic and Applications, 2007. FPL 2007. International Conference on. IEEE, 2007.*

* cited by examiner

DATA PROCESSING APPARATUS FOR SEGMENTAL PROCESSING OF INPUT DATA, SYSTEMS USING THE APPARATUS AND METHODS FOR DATA TRANSMITTAL

FIELD OF INVENTION

This invention relates to an apparatus for data processing, primarily in relation to segmental processing of input data. Applications of the apparatus, and methods for data transmittal are also disclosed.

BACKGROUND

Advances in quantitative computing power for data processors has led to improvements in apparatus used for reproduction of media content for users. Typically, the media content may be said to be in a high definition format, with high definition being in relation to image quality of the media content and the clarity of the audio quality of the media content. It should be appreciated that high definition image quality is typically understood to mean a resolution of at least 1080 p (resolution of 1920×1080) while the high definition audio quality is typically understood to mean audio quality (including speech, background sounds and effects) which is clearly perceptible to a listener. It should also be noted that media content may include a video conferencing stream.

The aforementioned apparatus for facilitating reproduction of high definition media content typically requires higher performance than what is usually available from a single data processor. Typically, two or more data processors may be used to achieve the required performance, but may fail if data is unable to be transmitted between the data processors at an adequate speed (transfer rate). In order to manage the cost of the aforementioned apparatus, the processors being selected for use in the apparatus are typically low cost processors that do not have a large number of available data pins to serve as processor-to-processor connections.

Typically, a low cost processor used primarily for processing of media content would have an output video bus for driving a display, and would similarly have an input bus for accepting data from a sensor. An output video bus of one processor may be joined to an input bus of another processor to form a data transmission channel if the protocols are compatible. However, video buses are designed to stream data continuously and are not suitable for transmitting discrete data packets. Furthermore, a well known property of video relates to how it repeats every frame with the same timing, and this property is typically used to load data in a FIFO manner in preparation for the next frame. The continuous nature of video transmission makes it difficult to use the same protocol for conventional data transmission which takes place when required and without periodic behaviour.

Thus, it is desirable to provide an apparatus for data processing of media content using video bus as a data transmission channel without suffering any detriment in relation to both cost and performance of the apparatus.

SUMMARY

In a first aspect, there is provided a data processing apparatus for segmental processing of input data. The apparatus includes a plurality of data processors connected in a series configuration, the plurality of data processors being able to transmit discrete data packets over a video bus to one another, with the plurality of data processors being divided into a plurality of data processing sets; and a central controller coupled to the plurality of data processors for controlling allocation of the input data to the plurality of data processing sets, the central controller being also for controlling transmission of output data from the apparatus. It is advantageous that each of the plurality of data processing sets is for processing at least one segment of the input data.

The transmitting of discrete data packets over the video bus includes transmitting data to an output video bus of a first data processor; receiving the data at an input video bus of a second data processor; transmitting control signals from the first data processor; and receiving the control signals at the second data processor. Preferably, the control signals determine a flow of data to the second data processor. The control signals may be transmitted using, for example, I2C bus, SPI bus, general purpose input/output pins and so forth.

Preferably, the apparatus further includes an interrupt being sent to the first data processor from the second data processor once a first discrete data packet is received at the second data processor, the interrupt being for indicating to the first data processor that the first discrete data packet is received at the second data processor. The discrete data packets may be formatted to appear like video frames by giving each packet both vertical and horizontal blanking periods with synchronization signals within the blanking periods.

It is advantageous that a number of the plurality of data processors determines a quantitative processing capability of the apparatus. In addition, each of the plurality of data processing sets may include a set controller, with the set controller being one of the plurality of data processors in the data processing set, with the set controller being designated for either a permanent or temporary basis. The set controller may allocate data for processing amongst data processors of the data processing set in accordance with at least one parameter such as, for example, logic/work load on each data processor, physical location of each data processor and so forth.

In another aspect, there is provided a video conferencing system employing the aforementioned apparatus, where each data processing set is used for at least one task such as, for example, decoding input data from parties in the video conference, composing output data for transmission to parties in the video conference in accordance with either user preferences or predetermined presentation arrangements, encoding the composited output data to a pre-determined quality, any combination of the aforementioned and the like.

It is advantageous that the quality of the composed output data is transmitted in accordance with at least one parameter such as, for example, a video conference system configuration of each recipient, available data bandwidth of each recipient, and so forth.

There is also provided a system for generating an image using ray tracing employing the aforementioned apparatus. Each data processing set is used for at least one task such as, for example processing discrete portions of the image, combining discrete portions of the image, processing discrete portions of a subsequent image and so forth. It is advantageous that the system enables a plurality of ray traced images to be displayed at a faster rate because subsequent images have been processed and are awaiting display.

Another aspect provides a method for transmitting discrete data packets between a first and a second data processor over video bus. The method includes transmitting data to an output video bus of the first data processor; receiving the data at an input video bus of the second data processor; transmitting control signals from the first data processor; and receiving the control signals at the second data processor. It is preferable that the control signals determine a flow of data to the second data processor. The control signals may be transmitted using, for example, I2C bus, SPI bus, general purpose input/output pins and the like.

The method may further include an interrupt being sent to the first data processor from the second data processor once a first discrete data packet is received at the second data processor, the interrupt being for indicating to the first data processor that the first discrete data packet is received at the second data processor. The discrete data packets may be formatted to appear like video frames by giving each packet both vertical and horizontal blanking periods with synchronization signals within the blanking periods. It is preferable that a number of lines of the video frame is determined using {v*d/h} and length of the video frame is determined using d/(number of lines of the video frame)

In a final aspect, there is provided a method for flow control of data packets between data processors. The method includes transmitting data from a transmitting processor; and receiving data at a receiving processor, the receiving processing outputting two signals to the transmitting processor, with the two signals indicating four states of one wait state, two ready states and one error state. It is preferable that the transmitting processor sends a new packet when one of the two signals is in a "ready" state, does not send a new packet when none of the two signals is in a "ready" state, and re-sends a previous data packet when both the two signals are in a "ready" state.

It is advantageous that the values assigned to each state are grey coded for transitions between either the wait state and any ready state or the error state and any ready state. The signal transition between any ready state may pass through the wait state. Advantageously, the signal transition from a ready state to the wait state indicates the transmitting processor may release resources associated with the last sent packet.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
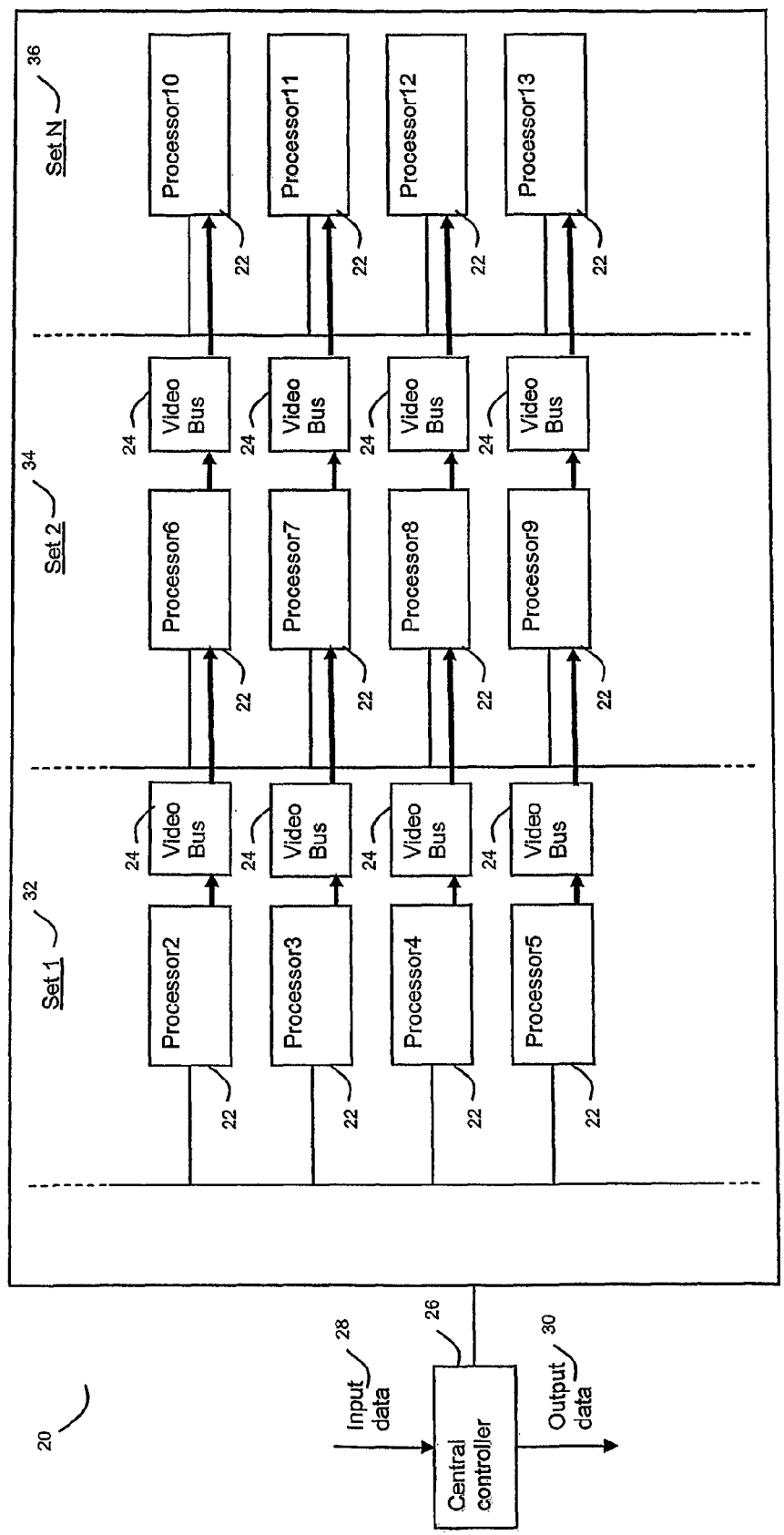
FIG. 1 shows a schematic overview of an apparatus of the present invention.

Referring to FIG. 1, there is provided a schematic overview for a data processing apparatus 20 for segmental processing of input data 28. The data processing apparatus 20 may include a plurality of data processors 22 which are connected in a series configuration. The plurality of data processors 22 may be able to transmit discrete data packets over a video bus 24 to one another. Control signals may be sent from a receiving processor to a transmitting processor amongst the plurality of data processors 22.

The transmission of discrete data packets over the video bus 24 from one data processor 22 to another will be described in greater detail in a subsequent portion of the description. Similarly, transmission of control signals amongst the plurality of data processors 22 will also be described in greater detail in a later portion of the description. It should be appreciated that a data transfer rate between the data processors 22 through the data channel provided by the series connection is typically physically limited by a number of pins available for inter-processor connections. The data processors 22 used in the apparatus 20 may be either identical or different. Different data processors 22 may be used as long as the number of pins for inter-processor connections are compatible (not necessarily matching) for the data processors 22.

As shown in FIG. 1, the plurality of data processors 22 which are connected in a series configuration may be divided into a plurality of data processing sets 32, 34, 36. Sets 1 (32), 2 (34) and N (36) are shown to illustrate the various data processing sets 32, 34, 36 in the data processing apparatus 20. It should be appreciated that there may be more than three data processing sets in the data processing apparatus 20. It should also be appreciated that a number of data processors 22 in each data processing set may be variable.

The data processing apparatus 20 may also include a central controller 26 coupled to the plurality of data processors 22 for controlling allocation of the input data 28 to each of the plurality of data processing sets 32, 34, 36. It should be appreciated that the central controller 26 may be a data processor which is either identical or different from the data processors 22 used in the apparatus 20. The central controller 26 may determine which segment of the input data 28 is processed by which data processing set 32, 34, 36. Furthermore, the central controller 26 may also allocate a particular data processor(s) 22 to a particular data processing set to bolster a processing capability of the particular data set. This is advantageous because if a data processing set requires more processing power for a particular task to be carried out, it will not lack the required processing power as the processing power for each data processing set is dynamic and dependent on processing requirements for the data processing set. The segment of the input data 28 may be either a portion or a section of the input data 28. Furthermore, the central controller 26 may also be used for controlling transmission of output data 30 from the apparatus 20. The output data 30 is data which has been processed by the plurality of data processing sets 32, 34, 36.

FIG. 1 shows the plurality of data processors 22 connected in a series configuration. Discrete data packets are passed through the video bus 24 of each data processor 22 from a data processor 22 in set 1 (32) to a corresponding data processor 22 in set 2 (34). To facilitate the transfer of the discrete data packets via the video bus 24, the discrete data packets may be formatted to appear like video frames by giving each packet vertical blank, and horizontal blank periods with synchronization signals within the blank periods. For example, data from processor 2 (in set 1 (32)) is shown to be transmitted to processor 6. Subsequently, data from processor 6 (in set 2 (34)) is also transmitted to processor 10 (in set N (36)) through video bus 24. It should be appreciated that data from one data processor 22 to another data processor 22 may also be transmitted using the data channel of the series connection between the data processors 22.

A number of the plurality of data processors 22 may determine a quantitative processing capability of the apparatus 20. For example, a series connection of ten data processors 22 rated at 1 GHz of processing speed will mean that the apparatus 20 will be rated at a processing speed of 10 GHz (resulting from 10×1 GHz). As a further example, a series connection of eight data processors 22 rated at 0.5 GHz and twelve data processors 22 rated at 1.2 GHz will mean that the apparatus 20 will be rated at a processing speed of 18.4 GHz (resulting from [8×0.5 GHz]+[12×1.2 GHz]). The quantitative processing capability of the apparatus 20 may be determined using a simple addition of individual processing speeds of the plurality of data processors 22 because the apparatus 20 enables the plurality of data processors 20 to be processing data substantially concurrently, and not sequentially. It should be appreciated that the quantitative processing capability of the apparatus 20 may be enhanced by either using faster processors or adding more processors.

In the apparatus 20, each of the plurality of data processing sets 32, 34, 36 includes a set controller, the set controller being any one of the plurality of data processors 22 in the data processing set 32, 34, 36. The set controller may be designated as such by the central controller 26 and would receive instructions from the central controller 26 for controlling the data processing set which the set controller is a part of. It should be appreciated that designation of the set controller for any of the processing sets 32, 34, 36 by the central controller 26 may be either permanent or temporary. It should be noted that temporary should be understood to denote a period of time which is not indefinite. The set controller may allocate data for processing amongst the plurality of data processors 22 of the data processing set in accordance with at least one parameter such as, for example, logic/work load on each data processor 22, physical location of each data processor 22 in the apparatus 20 and so forth. The physical location of each data processor 22 in the apparatus 20 may affect the time taken by the data to reach the data processor 22 for processing, consequently affecting processing time of the data.

The following section will now describe in greater detail, how discrete data packets are transmitted amongst the data processors 22 via video bus 24. Reference will be made to FIGS. 2-4, 7 and 8 when describing how discrete data packets are transmitted over the video bus 24 between a plurality of data processors 22.

A typical video bus consists of data and timing signals, namely, vertical_synchronisation, horizontal_synchronisation, valid data, data and clock. The aforementioned data and timing signals may be collectively known as control signals. A video output device typically drives the aforementioned signals to a display while a video input device typically receives the aforementioned signals from an image capture device. The timing signals (vertical_synchronisation and horizontal_synchronisation) are typically used to indicate when video data is valid and when a line and a frame are complete.

Figure 7:
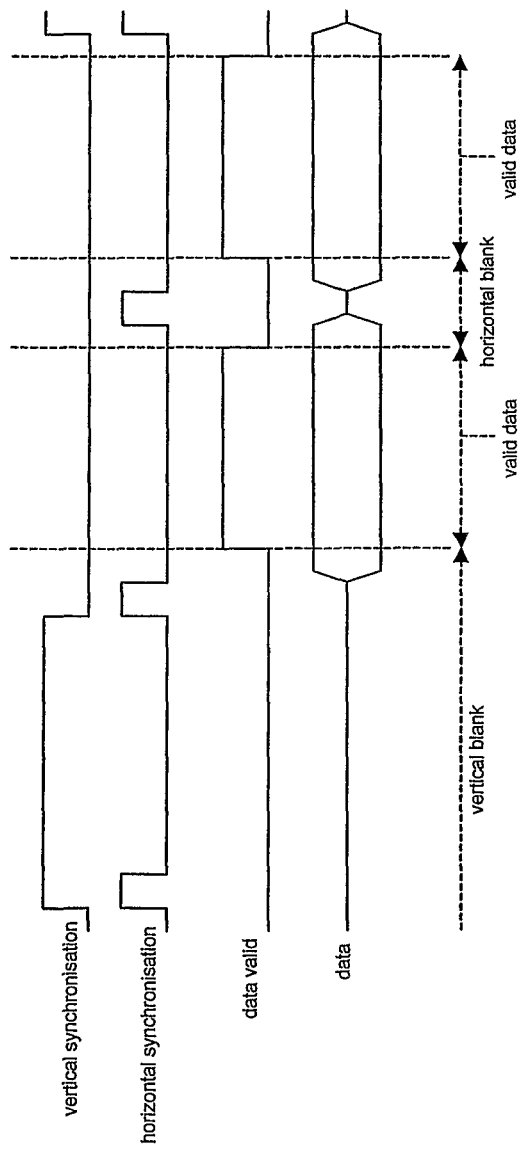
FIG. 7 shows an example of the timing of the control signals.

A simplified example of a form of the control signals is shown in FIG. 7. Referring to a "vertical_synchronisation" row in FIG. 7, the signal is in a "1" state when a frame begins. Similarly, referring to the "horizontal_synchronisation" row in FIG. 7, the signal is in a "1" state when a line begins. In FIG. 7, the "data valid" signal is in a "1" state while the "data" signal carries information to be received. The "data valid" signal may be set to a "0" state within a line during temporary/periodic suspension of data transmission. It should be appreciated that the polarity of the aforementioned signals may be inverted, hence a "1" state and a "0" state is not absolute and depends on the polarity of the signals.

Figure 2:
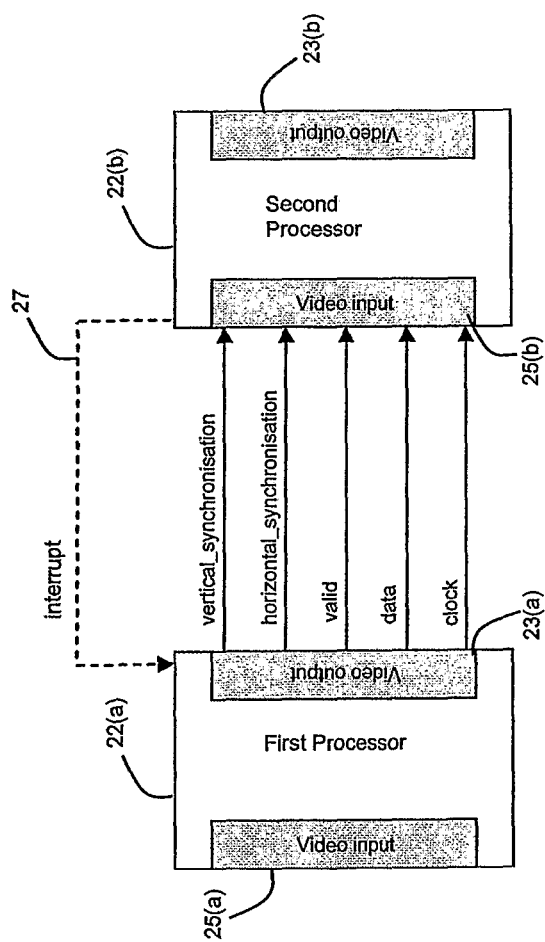
FIG. 2 shows a schematic view of communications between two data processors over video bus.
Figure 8:
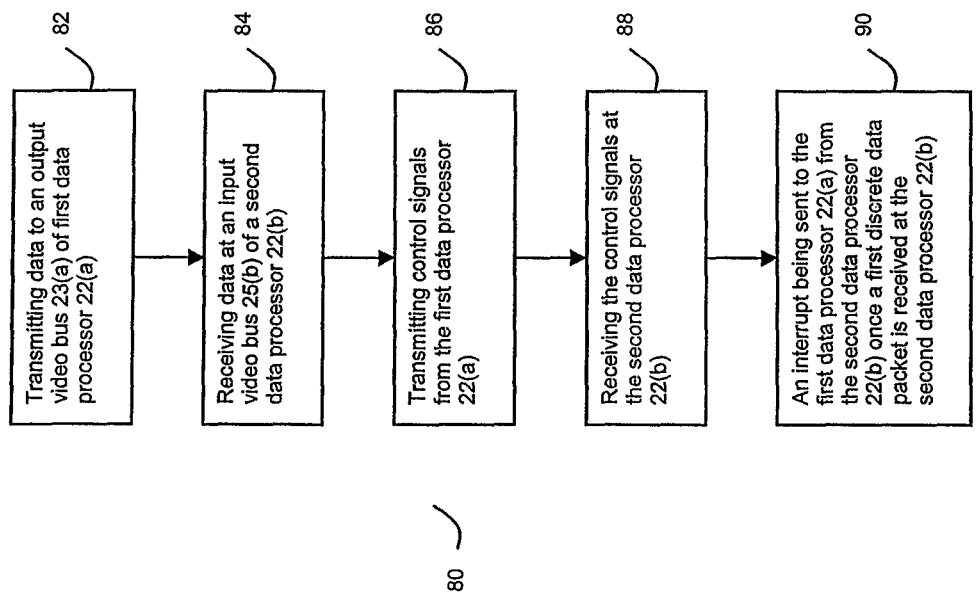
FIG. 8 shows a process flow for a method of data transfer for the present invention.

Referring to FIGS. 2 and 8, there is shown a schematic view and a process flow for a method 80 for transmitting discrete data packets between a first 22(a) and a second data processor 22(b), over video bus respectively. The method 80 allows a single frame (discrete packet of data) to be transmitted. The method 80 is used to transmit a single data packet from the first data processor 22(a) to the second data processor 22(b). The next data packet is transmitted when a subsequent single video frame is transmitted. The method 80 includes transmitting data 82 (in packets) to an output video bus 23(a) of the first data processor 22(a). The data transmitted from the output video bus 23(a) of the first data processor 22(a) is then received 84 at an input video bus 25(b) of the second data processor 22(b). Control signals as mentioned earlier (sample illustration in FIG. 7) are also transmitted 86 from the first data processor 22(a) to the second data processor 22(b) through the output video bus 23(a) of the first data processor 22(a). The control signals transmitted from the output video bus 23(a) of the first data processor 22(a) may be received 88 at the input video bus 25(b) of the second data processor 22(b). It should be appreciated that the control signals determine a rate of flow of data from the first data processor 22(a) to the second data processor 22(b).

Referring to FIG. 7 again, it can be seen that valid data is transmitted when the frame and line is complete ("vertical_synchronisation" signal is in a "0" state and "horizontal_synchronisation" signal is in a "0" state). To achieve this, the video output unit should be able to stop in the vertical blank period following data transmission but before the vertical synchronisation pulse, so leaving the video bus in a state from which the next transmission may start cleanly when required. An interrupt 27 may be generated 90 from the second data processor 22(b) to indicate to the first data processor 22(a) that the packet has been received at the second data processor 22(b) and the video output bus 23(a) of the first data processor 22(a) is available for the next packet of data. The interrupt 27 may be a form of flow control which prevents a packet of data from being transmitted from the first data processor 22(a) when the second data processor 22(b) is not in a state to receive the packet of data. The interrupt 27 may be implemented by either dedicated signal pins or general purpose bus such as, for example, I2C, SPI, other single or multi-wire protocols and so forth.

Figure 3:
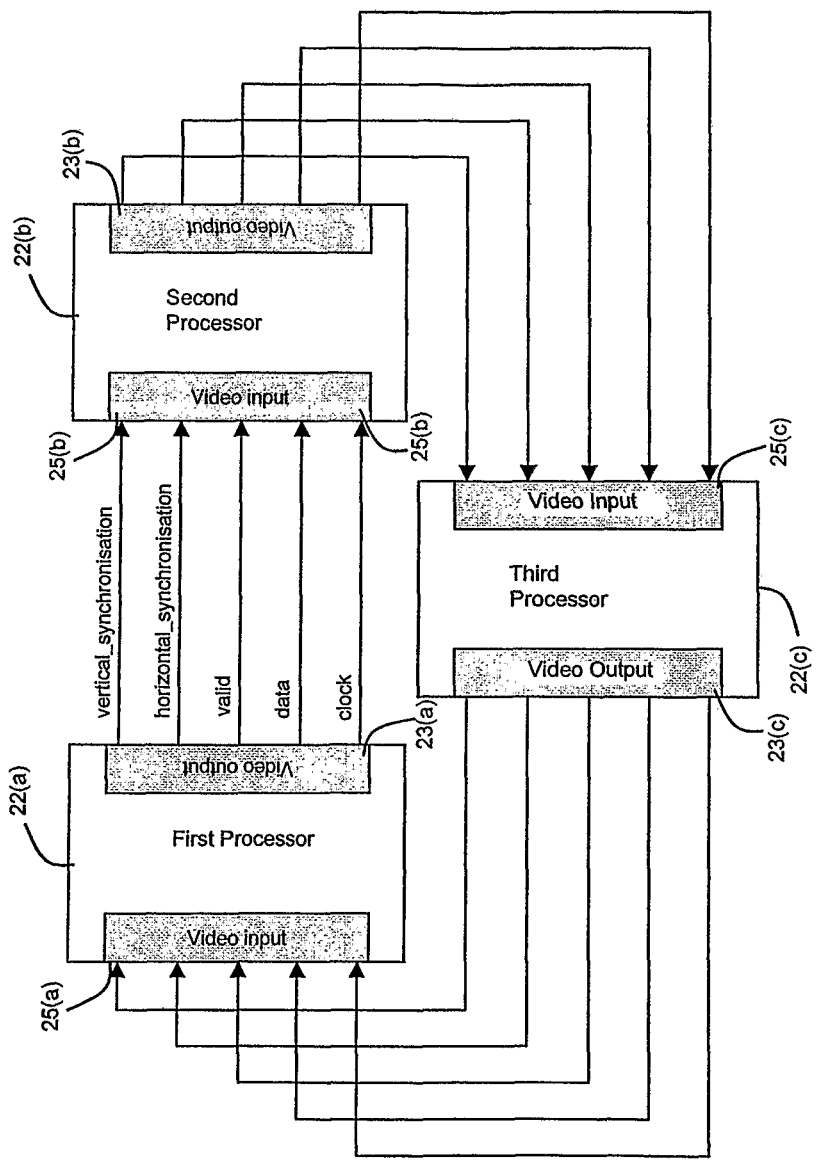
FIG. 3 shows a schematic view of communications between three data processors over video bus.

FIG. 3 shows a schematic view of transmitting discrete data packets from the first data processor 22(a) to the second data processor 22(b) to a third data processor 22(c) over video bus. The method of transmitting discrete data packets from the second data processor 22(b) to the third data processor 22(c) is identical to the method 80 as described earlier for the transmission of discrete data packets from the first data processor 22(a) to the second data processor 22(b).

Figure 4:
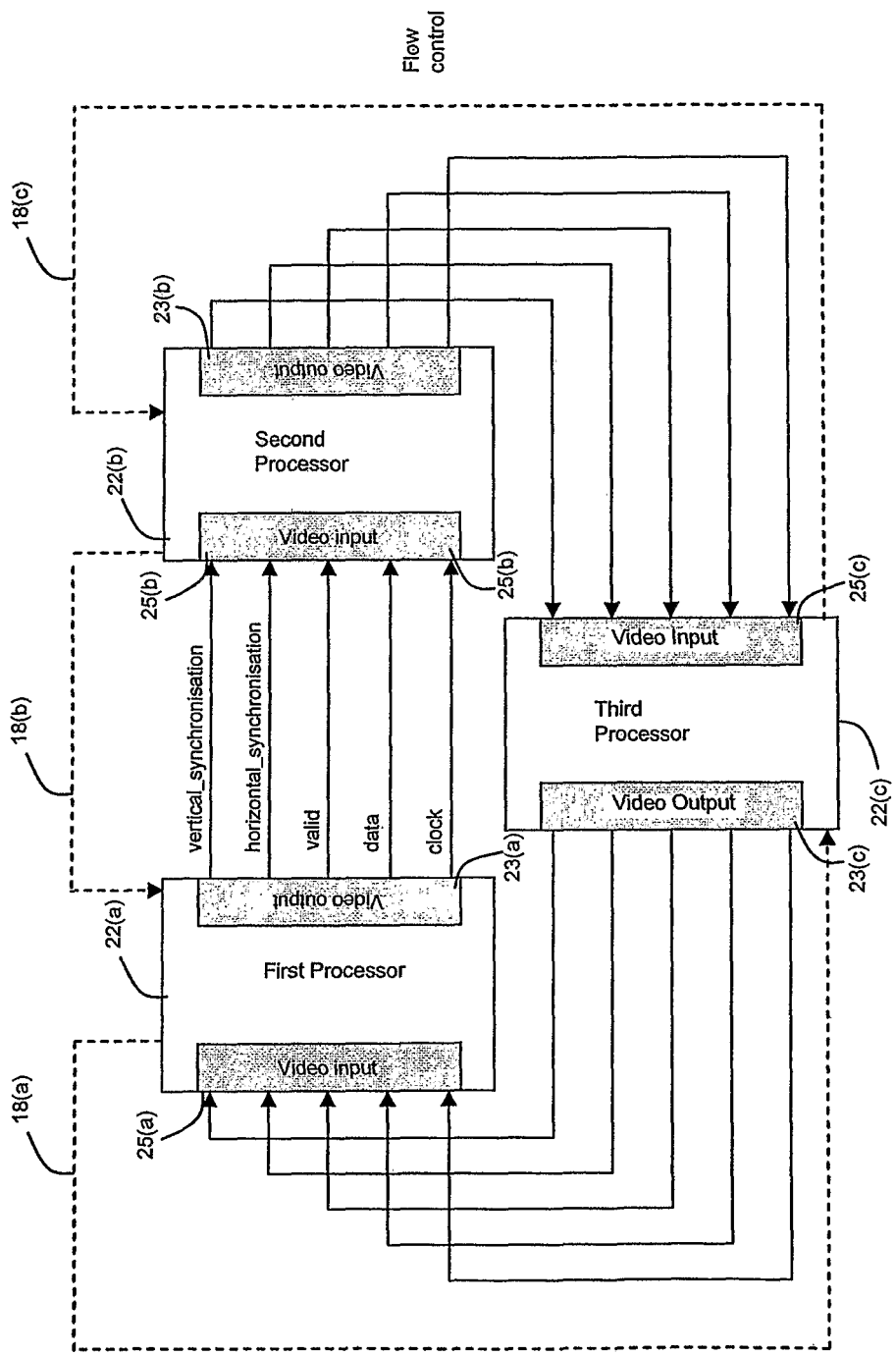
FIG. 4 shows a schematic view of flow control between the three data processors as shown in FIG. 3.

The incoming data received by the video input bus 25(b) of the second data processor 22(b) may be formatted to appear as video frames by giving each packet both vertical and horizontal blanking periods with synchronization signals within the blanking periods. As no data is transmitted in the blanking periods the dimensions of each 'frame' (packet of data) should be set to maximise the efficiency of the data transfer. Different video units may have different requirements for the number of lines of vertical blanking periods and clocks of horizontal blanking periods used, and the following formulae may be used to calculate the optimum frame dimensions:

$$lines=\{v*d/h\}$$

and $$length=d/lines$$

where:
lines=number of lines of active video
length=number of clocks of valid data per line
v=number of lines of vertical blanking period
h=number of clocks of horizontal blanking period
d=total number of clocks of data to transmit It is important for some form of flow control to be implemented which prevents a data packet from being transmitted when a receiving data processor is not in a state to receive the data packet. The flow control may be implemented by dedicated signal pins or by a general purpose bus such as, for example, I2C, SPI, other single or multi-wire protocols and so fort FIG. 4 is identical to FIG. 3 with the addition of flow control signals 18. It should be noted that the flow control is controlled by the receiving data processor for the transmitting data processor, and this is shown in FIG. 4 as the third data processor 22(c) controlling the second data processor 22(b), and the second data processor 22(b) controlling the first data processor 22(a).

Figure 9:
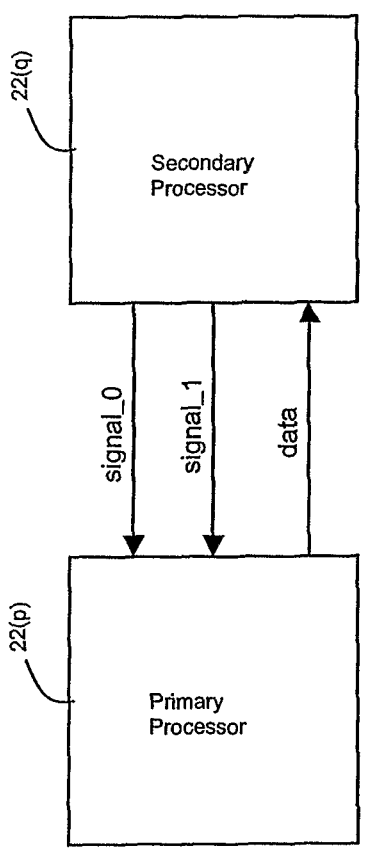
FIG. 9 shows a schematic view of communications between two data processors using a handshake process.

Referring to FIGS. 9-13, further details will be provided for the flow control amongst the plurality of data processors 22. FIG. 9 shows a primary processor 22(p), and a secondary processor 22(q). There is shown use of a first wire for transmitting "signal_0" and a second wire for transmitting "signal_1", both wires being for managing the flow of data, with signals in both wires being driven by the secondary processor 22(q) and monitored by the primary processor 22(p), which also acts as a transmitter of data. Correspondingly, the secondary processor 22(q) acts as a receiver of data.

Figure 10:
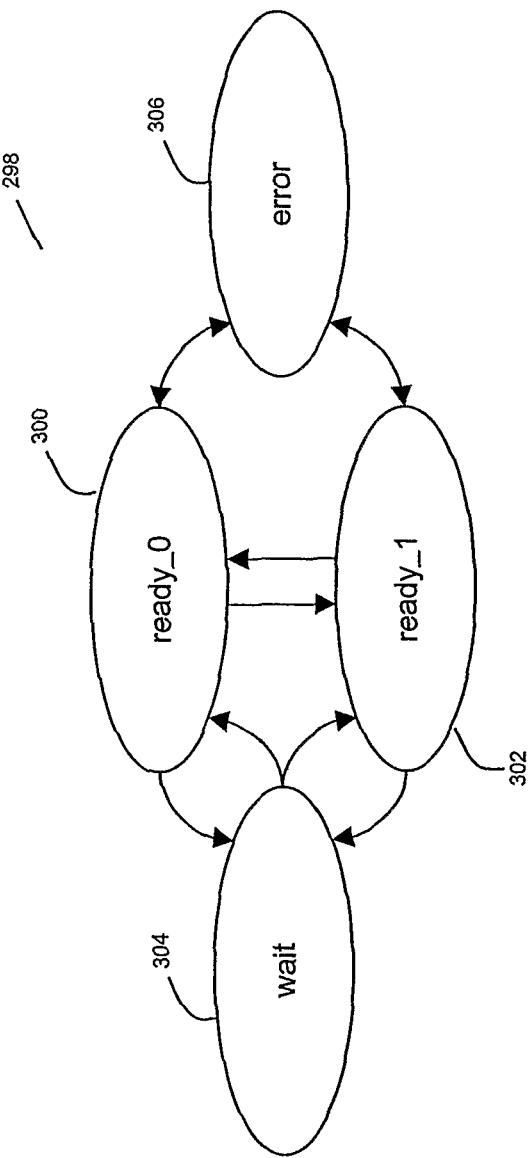
FIG. 10 shows possible paths amongst various states from a receiving processor.
Figure 13:
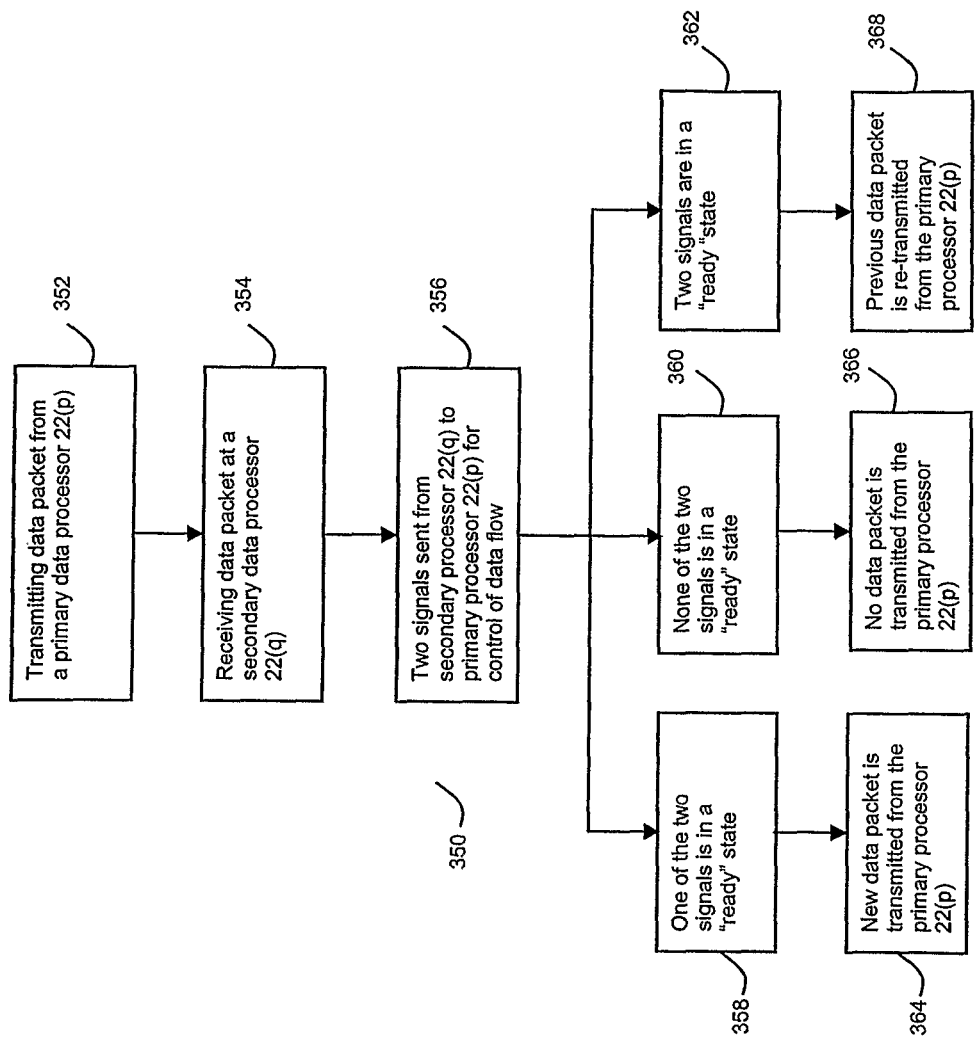
FIG. 13 shows a process flow for flow control for the present application.

Flow control between processors 22(p), 22(q) is managed by cycling through four states 298 as shown in FIG. 10. A process flow for a method of flow control 350 is shown in FIG. 13. Data is transmitted from the primary processor 22(p) 352, with the data being received at the secondary processor 22(q) 354. Two signals are sent from the secondary processor 22(q) to the primary processor 22(p) for control of data flow 356. If one of the two signals sent to the primary processor 22(p) is in a "ready" state 358, a new data packet is consequently transmitted from the primary processor 22(p) to the secondary processor 22(q) 364. Similarly, if none of the two signals is in a "ready" state 360, then no data packets are transmitted from the primary processor 22(p) to the secondary processor 22(q) 366. Finally, if the two signals are in a "ready" state 362, then the previous data packet is re-transmitted from the primary processor 22(p) to the second processor 22(q) 368 to address an erroneous state when both signals are in a "ready" state.

In normal operation the receiver 22(q) transitions between states of "ready_0" 300 and "ready_1" 302. The transmitter 22(p) may only send one data packet for each state transition it observes from the receive 22(q). Correspondingly, the transmitter 22(p) sends one packet when the re(indicates a state of "ready_0" 300 and then waits until the receiver shows a state of "ready_1" 302 before sending the next packet; subsequently, it then waits until it receives a state of "ready_0" 300 before sending a further packet.

When an error is detected in a received packet of data, the receiver enters a state of "error" 306 and the transmitter 22(p) re-sends the previous packet. If the packet is received correctly the receiver 22(q) either goes to a subsequent "ready" state, otherwise it returns to the previous "ready" state and the packet is re-transmitted again.

In an event when a packet is received and the receiver 22(q) is not able to accept the next packet, it goes to a "wait" 304 state until it is ready for the packet, at which point it goes to an appropriate "ready" 300, 302 state. Going to the "wait" 304 state advantageously tells the transmitter 22(p) that the packet has been received correctly and does not need to be kept for re-transmission, and this correspondingly allows memory and other resources to be freed earlier. The "wait" 304 state is transitory and the receiver 22(q) stays in the "wait" 304 state only long enough for it to become ready to receive a packet, so the transmitter 22(p) may fail to detect the "wait" 304 state. If the "wait" 304 state is not detected by the transmitter 22(p), the transmitter 22(p) subsequently discards the previously sent packet on the next "ready" 300, 302 state. In an instance when the receiver 22(q) undergoes a resetting of the four states 298, the receiver 22(q) goes to the "wait" 304 state until it is ready to receive a data packet.

Figures 11, 12:
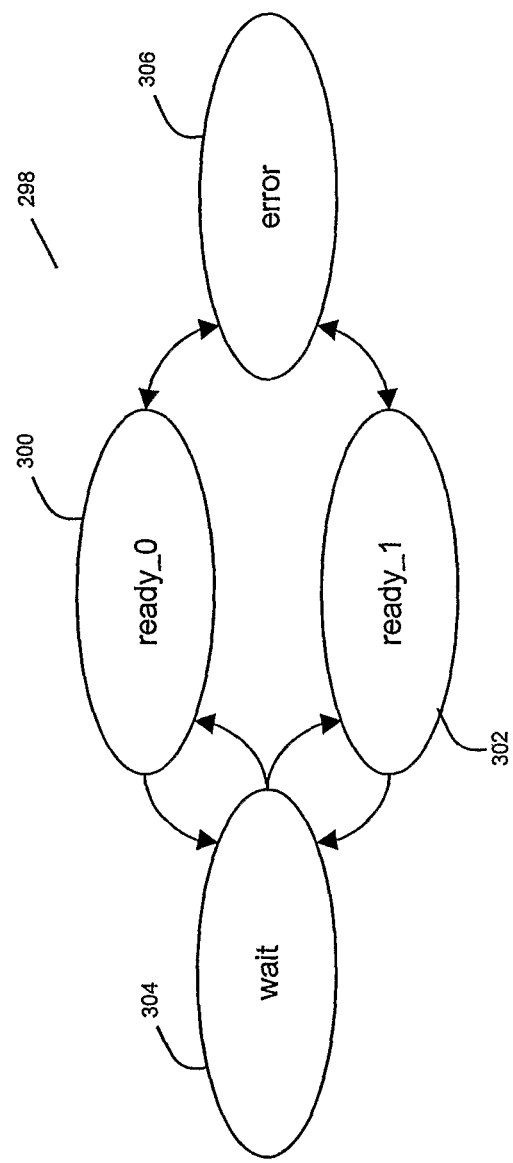
FIG. 11 shows a logic table in which transitions between the ready states and the wait and error states are grey coded.
FIG. 12 shows possible paths amongst various states from a receiving processor which avoids direct transition between the ready states.

A logic table for the flow control listed in FIG. 11 shows a preferred embodiment in which transitions between the "ready" 300, 302, the "wait" 304 and the "error" 306 states are grey coded, meaning that only one bit changes in any of these state transitions. The transition between the two "ready" 300, 302 states is not grey coded, but in situations where the signals are susceptible to timing mismatches, a modification to the transitions between the four states 298 may be implemented by passing through the "wait" 304 state between the two "ready" 300, 302 states, as this may avoid false states being detected by the transmitter 22(p). FIG. 12 shows the aforementioned modified state transition diagram that avoids direct transition between the "ready" 300, 302 states.

It should be appreciated that a data packet may be either a single transmission on the data pins or a plurality of transmissions according to the overall protocol of the bus.

Applications of the apparatus 20 utilising the method 80 will now be described in the subsequent section. However, it should be appreciated that applications of the apparatus 20 are illustrative and should not be restricted to only what is described.

Figure 5:
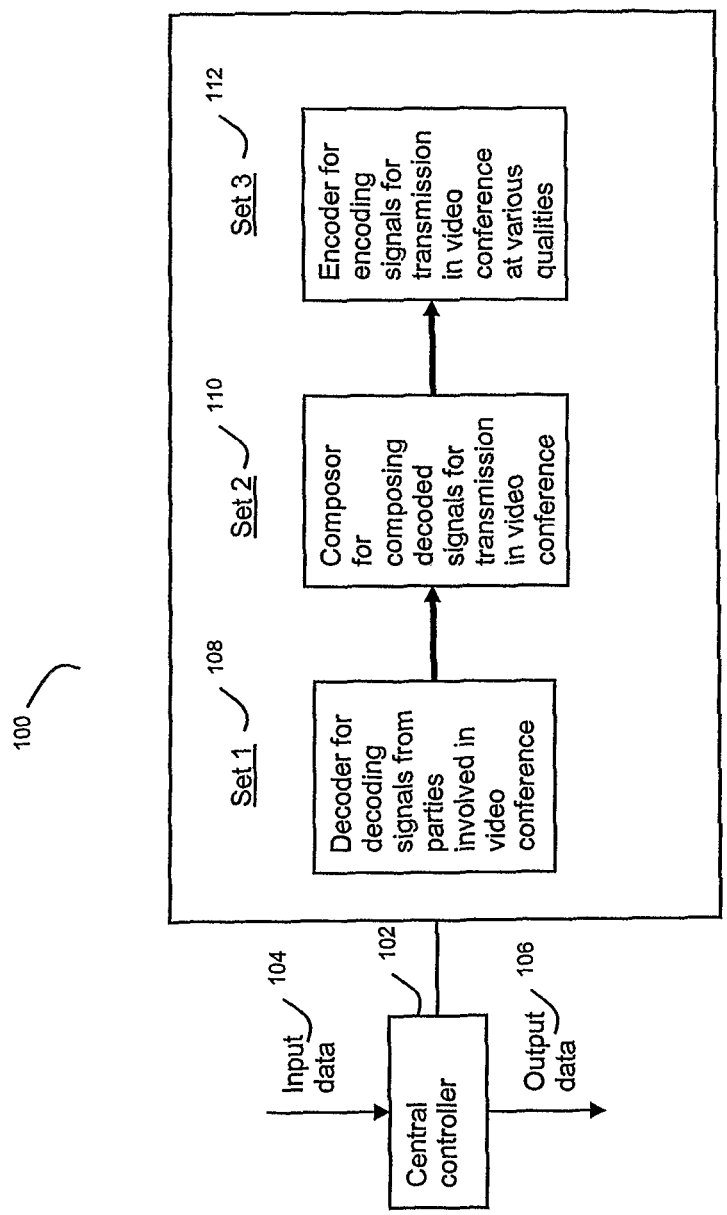
FIG. 5 shows a schematic overview of a first application of the apparatus of FIG. 1.

Referring to FIG. 5, there is shown a schematic overview of a video conferencing system 100 employing the apparatus 20. The video conferencing system 100 may be used by a video conferencing service provider for managing the video conference. The video conferencing system 100 includes a central controller 102 which processes both input data 104 and output data 106. The central controller 102 performs an identical function as the central controller 26 of the apparatus 20 as described earlier.

There are shown three data processing sets, Set 1 (108), Set 2 (110) and Set 3 (112). Each data processing set 108, 110, 112 is akin to the data processing sets 32, 34, 36 described earlier for the apparatus 20. In a sample embodiment, Set 1 (108) of the video conferencing system 100 may act as a decoder for decoding incoming video conferencing signals from a plurality of parties involved in the video conferencing session. It should be appreciated that the input data 104 (incoming video conferencing signals) from the plurality of parties differ due to differences in at least system configurations and available data bandwidth for the plurality of parties. In a non-limiting example, Set 1 (108) of the video conferencing system 100 may be broken-down further into sub-sets of data processors, each sub-set comprising at least one data processor, with each sub-set being for decoding incoming video conferencing signals from each party of the video conference. It should be appreciated that the input data 104 may also segmentized in any manner for processing by the sub-sets of Set 1 (108).

The signals which have been decoded in Set 1 (108) are then transmitted via video bus using the method 80 to Set 2 (110), where the decoded signals are composed into videos (images and voice data) viewed by the plurality of parties during the video conferencing session. The videos may be composed in accordance with either user preferences or pre-determined presentation arrangements. Once the videos have been composed, the composed videos are then transmitted via the video bus using the method 80 to Set 3 (112), where the stream of composed videos are encoded into a plurality of transmission bit rate qualities, at least one data processor in the Set 3 (112) being for a particular bit rate quality such as, for example, 1024 K, 512 K, 256 K, and so forth.

The stream of composed videos at the various bit rate qualities are then transmitted using the video bus in the video conferencing system 100 to the central controller 102, where the composed videos are transmitted as output data 106 in accordance with at least one parameter at a recipient end such as, for example, a system configuration of the recipient, available data bandwidth of the recipient and so forth. Thus, the recipient with a higher data bandwidth capability is able to receive the stream of videos at a higher bit rate quality. This advantageously optimizes a video conferencing experience for each recipient of the video conference as the quality of the received videos is of the best possible quality in view of at least the video conference system configuration of each recipient, and available data bandwidth capability of each recipient.

Figure 6:
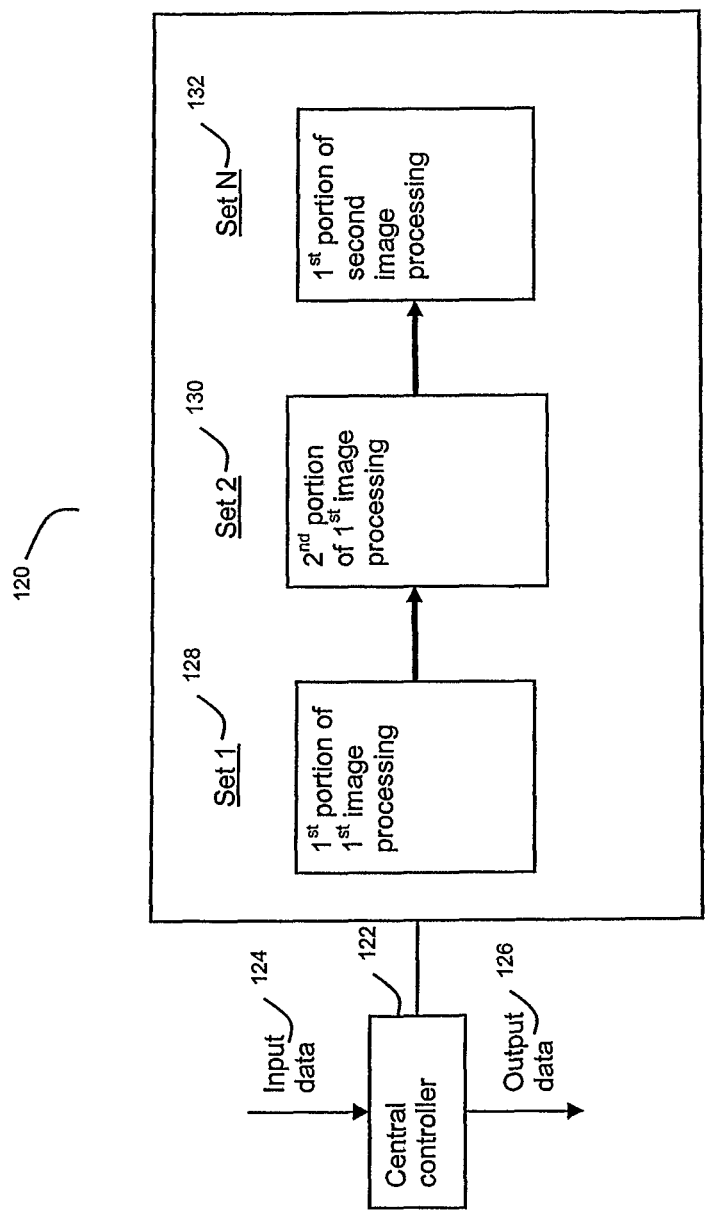
FIG. 6 shows a schematic overview of a second application of the apparatus of FIG. 1.

Referring to FIG. 6, there is shown a schematic overview of an image generation system 120 for generating an image using processor-intensive ray tracing processes employing the apparatus 20. The image generation system 120 includes a central controller 122 which processes both input data 124 and output data 126. The central controller 122 performs an identical function as the central controller 26 of the apparatus 20 as described earlier.

There are shown three data processing sets, Set 1 (128), Set 2 (130) and Set N (132). Each data processing set 128, 130, 132 is akin to the data processing sets 32, 34, 36 described earlier for the apparatus 20. In a sample embodiment, Set 1 (128) of the image generation system 120 may be for processing a first portion of a first image using ray tracing. The first portion may be, for example, a two dimensional portion of an image to be processed, a line (either vertical or horizontal) of the image to be processed.

The first portion which has been processed in Set 1 (128) is then transmitted via video bus using the method 80 to Set 2 (130), where a second portion of the first image is processed using ray tracing. The second portion may be, for example, a two-dimensional portion, a vertical line or a horizontal line of the image to be processed using ray tracing, but should preferably follow a form of the first portion. Set 2 (130) also combines the first portion of the first image with the second portion of the first image. There may be subsequent data processing sets after Set 2 (130) for processing a third portion using ray tracing then combining with earlier portions, processing a fourth portion using ray tracing then combining with earlier portions and so forth. Once a final portion of the image is processed using ray tracing, a complete processed image is transmitted using the video bus in the image generation system 120 to the central controller 122, where the first image subsequent to ray-tracing is transmitted as output data 126. Transmission of processed data to the central controller 122 should be via video bus in light of a data volume being transmitted to the central controller 122. Transmission of the processed data through the video bus takes advantage of a higher bandwidth of the video bus.

A first portion of a second (subsequent) image is transmitted via the video bus using the method 80 to Set N (132). The first portion of the second (subsequent) image is processed using ray tracing in Set N (132). The first portion may be, for example, a two-dimensional portion of an image to be processed, a line (either vertical or horizontal) of the image to be processed. Subsequent data processing sets connected to Set N (132) may be used to process subsequent portions of the second (subsequent) image. The portion-by-portion processing of the first image enabled by the image generation system 120 advantageously shortens processing time of images using ray tracing. In addition, the concurrent portion-by-portion processing of the second (subsequent) image also shortens processing time when multiple images using ray tracing are displayed. As such, the image generation system 120 advantageously displays a plurality of ray traced images at a faster rate because subsequent images have been processed and are awaiting display.

It should be appreciated that the apparatus 20 may be used in a complementary manner with other data processing devices in order to enhance the data processing capability of the other data processing devices. In this regard, the apparatus 20 may be usable as an enhancement module which is able to piggyback on other data processing devices for enhanced data processing capability.

Whilst there has been described in the foregoing description preferred embodiments of the present invention, it will be understood by those skilled in the technology concerned that many variations or modifications in details of design or construction may be made without departing from the present invention.

The invention claimed is:

1. A data processing apparatus for segmental processing of input data, the apparatus including:
   a plurality of data processing sets, each of the plurality of data processing sets comprising a plurality of data processors, a data processor from a data processing set being coupled in a series to a corresponding data processor from another data processing set in a manner such that discrete data packets are passed from a data processor from a data processing set to a corresponding data processor in another data processing set; and
   a central controller configurable to control allocation of the input data to the plurality of data processing sets so as to determine which segment of the input data is to be processed by which data processing set of the plurality of data processing sets, the central controller being also for controlling transmission of output data from the apparatus;
   wherein each of the plurality of data processing sets is for processing at least one segment of the input data and wherein each of the plurality of data processing sets includes a set controller which is designated by the central controller, the set controller being one of the plurality of data processors in the data processing set, the set controller being designated for either a permanent or temporary basis and being configured to receive instructions from the central controller for controlling the data processing set which the set controller is part of.

2. The apparatus of claim 1, wherein the discrete data packets are transmitted over a video bus and transmitting discrete data packets over the video bus includes:
- transmitting data to an output video bus of a first data processor;
- receiving the data at an input video bus of a second data processor;
- transmitting control signals from the first data processor; and
- receiving the control signals at the second data processor, wherein the control signals determine a flow of data to the second data processor.

3. The apparatus of claim 2, wherein the control signals are transmitted using at least one of a group comprising: I2C bus, SPI bus, and general purpose input/output pins.

4. The apparatus of claim 2, further including an interrupt being sent to the first data processor from the second data processor once a first discrete data packet is received at the second data processor, the interrupt being for indicating to the first data processor that the first discrete data packet is received at the second data processor.

5. The apparatus of claim 1, wherein the discrete data packets are formatted to appear like video frames by giving each packet both vertical and horizontal blanking periods with synchronization signals within the blanking periods.

6. The apparatus of claim 1, wherein a number of the plurality of data processors determines a quantitative processing capability of the apparatus.

7. The apparatus of claim 1, wherein the set controller allocates data for processing amongst data processors of the data processing set in accordance with at least one parameter selected from a group comprising: logic load on each data processor, and physical location of each data processor.

8. A video conferencing system employing the apparatus of claim 1, wherein each data processing set is used for at least one task selected from a group comprising: decoding input data from parties in the video conference, composing output data for transmission to parties in the video conference in accordance with either user preferences or predetermined presentation arrangements, encoding the composed output data to a pre-determined quality, and any combination of the aforementioned.

9. The video conferencing system of claim 8, wherein the quality of the composed output data is transmitted in accordance with at least one parameter selected from a group comprising: a video conference system configuration of each recipient, and available data bandwidth of each recipient.

10. A system for generating an image using ray tracing employing the apparatus of claim 1, wherein each data processing set is used for at least one task selected from a group comprising: processing discrete portions of the image, combining discrete portions of the image, and processing discrete portions of a subsequent image.

11. The system of claim 10, wherein a plurality of ray traced images are displayed at a faster rate because subsequent images have been processed and are awaiting display.

* * * * *